(12) United States Patent
Podilchuk et al.

(10) Patent No.: US 6,956,898 B1
(45) Date of Patent: Oct. 18, 2005

(54) METHOD AND APPARATUS FOR DENSE MOTION FIELD BASED CODING

(75) Inventors: Christine Irene Podilchuk, Bridgewater, NJ (US); Sergio Daniel Servetto, Urbana, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 611 days.

(21) Appl. No.: 09/368,380

(22) Filed: Aug. 4, 1999

Related U.S. Application Data

(60) Provisional application No. 60/102,776, filed on Oct. 2, 1998.

(51) Int. Cl.[7] .............................................. H04N 7/12
(52) U.S. Cl. ................................................... 375/240
(58) Field of Search ....................... 348/699; 382/232, 382/131; H04N 7/12

(56) References Cited

U.S. PATENT DOCUMENTS

| | | | | |
|---|---|---|---|---|
| 5,654,771 | A | * | 8/1997 | Tekalp .......................... 348/699 |
| 6,169,817 | B1 | * | 1/2001 | Parker .......................... 382/131 |
| 6,226,410 | B1 | * | 5/2001 | O'Rourke .................... 382/232 |

OTHER PUBLICATIONS

C. Bouman et al., "Multiple Resolution Segmentation of Textured Images," IEEE Transactions on Pattern Analysis and Machine Intelligence, vol. 13, No. 2, pp. 99-113, Feb. 1991.

S. German et al., "Stochastic Relaxation, Gibbs Distribution, and the Bayesian Restoration of Images," IEEE Transactions on Pattern Analysis and Machine Intelligence, vol. PAMI-6, No. 6, pp. 721-741, Nov. 1984.

T.S. Huang et al., "Motion and Structure from Feature Correspondences: A Review," Proceedings of the IEEE, vol. 82, No. 22, pp. 252-268, Feb. 1994.

J. Konrad et al., "Bayesian Estimation of Motion Vector Fields," IEEE Transactions on Pattern Analysis and Machine Intelligence, vol. 14, No. 9, pp. 910-927, Sep. 1992.

P. Moulin et al., "Multiscale Modeling and Estimation of Motion Fields for Video Coding," IEEE Transactions on Image Processing, vol. 6, No. 12, pp. 1606-1620, Dec. 1997.

A. Netravali et al., "Motion Compensated Television Coding," Part I, The Bell Systems Technical Journal, vol. 58, No. 3, pp. 631-670, Mar. 1979.

M.T. Orchard, "Predictive Motion Field Segmentation for Image Sequence Coding," IEEE Transactions on Circuits and Systems for Video Technology, vol. 3, No. 1, pp. 54-70, Feb. 1993.

M.T. Orchard et al., "Overlapped Block Motion Compensation: An Estimation Theoretic Approach," IEEE Transactions on Image Processing, vol. 3, No. 5, pp. 693-699, Sep. 1994.

(Continued)

*Primary Examiner*—Nhon Diep

(57) ABSTRACT

An encoder generates an estimate of apparent inter-image motion utilizing a dense motion field in a sequence of video frames or other images. The estimate in an illustrative embodiment includes a motion vector for each pixel of the dense motion field. The estimate is generated at least in part as a solution to a constrained optimization problem based on a multiscale data model characterizing the motion between pixels of the dense motion field and designated neighbor pixels. The estimate is used for motion compensation in encoding the corresponding images, and is itself encoded for transmission to a decoder for use in decoding the encoded images. In the illustrative embodiment, the multiscale data model characterizes spatial, temporal and scale coherence properties of the motion as a Markov random field (MRF), thereby ensuring that the resulting motion vectors can be efficiently coded for transmission to the decoder.

22 Claims, 2 Drawing Sheets

OTHER PUBLICATIONS

S.D. Servetto et al., "Stochastic Modeling and Entropy Constrained Estimation of Dense Motion Fields for Video Coding," IEEE Transactions on Image Processing, pp. 591-595, 1998.

S.D. Servetto et al., "Image Coding Based on a Morphological Representation of Wavelet Data," IEEE Transactions on Image Processing, vol. 8, No. 9, pp. 1161-1174, Sep. 1999.

Y. Shoham et al., "Efficient Bit Allocation for an Arbitrary Set of Quantizers," IEEE Transactions on Acoustics, Speech and Signal Processing, vol. 36, No. 9, pp. 1445-1453, Sep. 1988.

* cited by examiner

METHOD AND APPARATUS FOR DENSE MOTION FIELD BASED CODING

RELATED APPLICATION

The present application claims the benefit of U.S. Provisional Application No. 60/102,776, filed Oct. 2, 1998 and entitled "Stochastic Modeling and Entropy Constrained Estimation of Motion from Image Sequences."

FIELD OF THE INVENTION

The present invention relates generally to video signal processing, and more particularly to motion estimation and compensation techniques for use in coding of video or other types of image sequences.

BACKGROUND OF THE INVENTION

Motion video sequences typically contain a significant amount of intra-frame or "spatial" redundancy as well as inter-frame or "temporal" redundancy. Video compression techniques take advantage of this spatial and temporal redundancy to reduce significantly the amount of information bandwidth required to transmit, store and otherwise process video sequences. For example, in the well-known MPEG-2 video encoding standard, described in greater detail in International Telecommunications Union, "Generic Coding of Moving Pictures and Associated Audio," MPEG-2, 1994, discrete cosine transform (DCT), quantization and variable-length coding operations are used to remove spatial redundancy within a given frame in a sequence of video frames. Temporal or inter-frame redundancy is removed through a process of block-based inter-frame motion estimation and predictive coding.

MPEG-2 video frames may be either intra-coded (I) frames, forward-only predictive (P) frames or bidirectionally-predictive (B) frames. An I frame is encoded using only the spatial compression techniques noted above, while a P frame is encoded using "predictive" macroblocks selected from a single reference frame, where a macroblock corresponds to a 16×16 block of pixels. A given B frame is encoded using "bidirectionally-predictive" macroblocks generated by interpolating between a pair of predictive macroblocks selected from two reference frames, one preceding and the other following the B frame.

In a conventional MPEG-2 encoder, the output of the above-noted quantization operation is applied to an inverse quantizer and then to an inverse DCT generator. The output of the inverse DCT generator is processed over one or more frames by a motion estimator and motion compensator. The motion compensator computes motion vectors which are combined with a subsequent frame so as to reduce inter-frame redundancy and facilitate encoding. The motion vectors are explicitly transmitted as so-called side information to the decoder, for use in decoding the corresponding encoded video bitstream.

MPEG-2 and other conventional block-based motion-compensated video encoding techniques are used in a wide variety of video signal processing applications, including, e.g., video teleconferencing systems, video storage and retrieval systems, and satellite-based digital television systems.

Although it has been found in practice that acceptable video coding performance can be obtained using the above-described block-based motion estimation and compensation, there are inherent problems with this approach. One significant problem is that since physical motion is not piecewise constant, inaccurate compensation can occur at the boundaries of moving objects. As a result, there may be pixels within blocks containing non-uniform motion that are incorrectly compensated, and therefore a significant energy increase in the prediction error signal occurs, with a consequent increase in the bit rate necessary to encode this signal. In addition, at low bit rates, when high quality coding of the prediction error is not possible, blocking artifacts may become clearly visible in the reconstructed video frames. Furthermore, substantial efforts have been devoted over many years to optimizing block-based motion estimation and compensation, making it unlikely that significant performance gains remain to be achieved within that framework.

A need therefore exists for improved motion estimation and compensation techniques, for use in video coding systems and other image sequence processing applications, which overcome the problems associated with the conventional block-based techniques.

SUMMARY OF THE INVENTION

The invention provides video encoding techniques which perform motion estimation and compensation using a dense motion field rather than a block-based motion field. In accordance with the invention, an encoder generates an estimate of inter-frame motion utilizing a dense motion field in a sequence of video frames or other images. The estimate in an illustrative embodiment includes a motion vector for each pixel of the dense motion field. The estimate is generated at least in part as a solution to a constrained optimization problem based on a multiscale data model characterizing the motion between a given pixel in the dense motion field and neighboring pixels. The estimate is used for motion compensation in encoding the corresponding images, and is itself encoded for transmission to a decoder for use in decoding the encoded images. Advantageously, the constrained optimization based on the multiscale data model ensures that the set of motion vectors generated for the dense motion field can be efficiently coded for transmission to the decoder.

In the illustrative embodiment of the invention, the multiscale data model characterizes spatial, temporal and scale coherence properties of the motion as a Markov random field (MRF). The model utilizes singleton potential functions to characterize the manner in which observations of particular types of dense motion fields affect the likelihood with which such fields occur, and higher order potential functions to characterize structural properties of dense motion fields. In accordance with the invention, the constrained optimization problem comprises a first maximum a posteriori (MAP) estimation problem with a constraint on the entropy of the desired estimate. This problem is transformed into a second, more readily-solvable MAP estimation problem having at least one parameter uniquely determined by the entropy constraint of the constrained optimization problem. A solution of the second MAP estimation problem minimizes a singleton potential function subject to the entropy constraint, wherein the entropy constraint is computed based on one or more higher order potential functions.

The invention can provide improved performance relative to conventional block-based coding, particularly for high-motion images. Moreover, the invention eliminates certain blocking artifacts commonly associated with block-based coding, resulting in higher quality reconstructed images. The invention is suitable for use in conjunction with a wide variety of different video encoding systems. These and other features and advantages of the present invention will become more apparent from the accompanying drawings and the following detailed description.

DETAILED DESCRIPTION OF THE INVENTION

Figure 1:
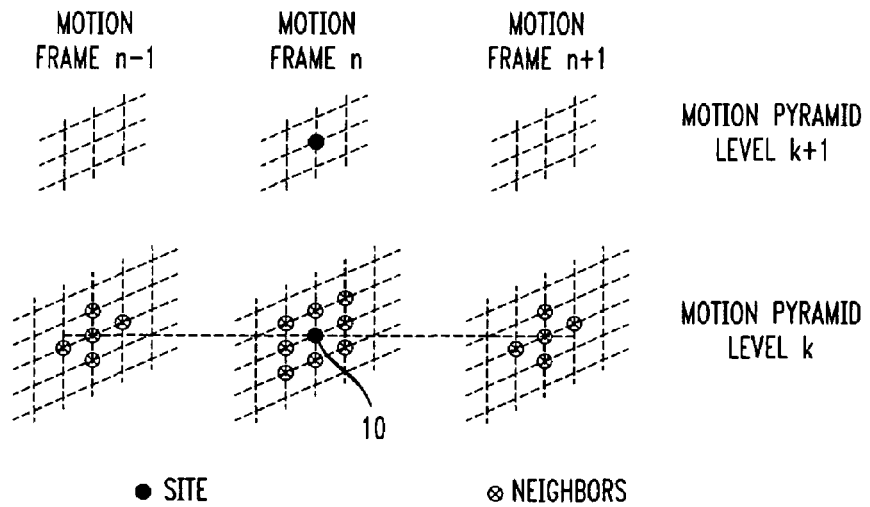
FIG. 1 illustrates the operation of dense motion field estimation in accordance with the invention.

The following description will illustrate the invention using an exemplary video encoder. It should be understood, however, that the invention is not limited to use with any particular type of signal format, encoding standard, encoder architecture or encoding system configuration. The invention is instead more generally applicable to any encoding application in which it is desirable to take advantage of temporal correlation between images. The term "image sequence" should be understood to include any frame sequence or other type of video sequence which is in a form suitable for encoding, e.g., suitable for encoding in accordance with standards such as H.261, H.263, Motion-JPEG, MPEG-1, MPEG-2, etc. The term "image" as used herein is therefore intended to include a frame or field of a video sequence.

The present invention provides image sequence encoding techniques which utilize motion estimation and compensation based on a dense motion field, rather than the block-based motion estimation and compensation of conventional techniques. The dense motion field based estimates in an illustrative embodiment assume motion in an observed image sequence to be a stochastic process, modeled as a Markov random field (MRF). In accordance with the invention, a standard maximum a posteriori (MAP) estimation problem with MRF priors is formulated as a constrained optimization problem, where the constraint is on the entropy of the sought estimate. The constrained optimization problem is then transformed into a classical MAP estimation problem which can be solved using standard techniques. A key advantage of this constrained formulation is that, in the process of transforming the formulation back to the classical framework, parameters which in the classical framework are left unspecified, and often adjusted in an experimental stage, become uniquely determined by the introduced entropy constraint.

The term "dense motion field estimation" in the illustrative embodiment refers generally to an arrangement in which a single motion vector is generated for a given pixel of a particular motion field. In conventional block-based video encoders, motion vectors are generally based on 16×16 or 8×8 blocks of pixels, since it has been determined that this amount of information can be coded in an efficient manner and sent to the decoder as side information. Although finer motion vectors, e.g., motion vectors based on 4×4 or 2×2 blocks of pixels or on single pixels, provide better prediction, it has heretofore generally been believed that the resulting increased amount of side information cannot be encoded efficiently enough to produce an acceptable level of compression.

The present invention overcomes this problem by utilizing an MRF model which imposes a piecewise smoothness constraint on the motion field. This approach is appropriate since within a given object, it is expected that the motion will be uniform. By forcing the motion field to be smooth using the techniques of the invention, the motion field can be encoded very efficiently. Without this smoothness constraint, i.e., if the dense motion field estimation process simply attempted to find a motion vector for every pixel in the motion field by matching pixel data between frames, the resulting motion vectors would generally be going in many different directions and would therefore be very difficult to encode efficiently.

The invention in the illustrative embodiment provides (i) a multiscale MRF data model which captures spatial, temporal and scale coherence properties of motion fields, (ii) algorithms for computing MAP estimates for the MRF data model and for coding the motion fields produced by the MAP estimates, and (iii) a corresponding video coding system.

It is well known that an efficient way to specify MRFs is by means of the Hammersley-Clifford theorem, which proves the equivalence between MRFs and so-called Gibbs distributions. Gibbs distributions are described in greater detail in, e.g., S. Geman and D. Geman, "Stochastic Relaxation, Gibbs Distribution, and the Bayesian Restoration of Images," IEEE Transactions on Pattern Analysis and Machine Intelligence, PAMI-6(6), pp. 721–741, November 1984, which is incorporated by reference herein. To define a proper Gibbs distribution, the following two sets of functions have to be specified:

1. Singleton potentials, which force consistency between the random field and the observed data. Intuitively, by a proper choice of singleton potentials, a statistician is able to specify "degrees of agreement" between different realizations of the random field and the observed data.
2. Higher order potentials, which reflect the structure of the field, independent of the observations. Intuitively, by a proper choice of these potentials, the statistician is able to express within the model properties of the data assumed a priori, e.g., smoothness, location of discontinuities, etc.

It is clear that, unless the observed data is constrained in some way to agree with the structural properties of the field, the goals of having a field which simultaneously agrees with the observed data, i.e., minimizes the singleton potentials, and has the desired structural properties, i.e., minimizes the higher order potentials, are contradictory. This contradiction has been widely recognized as a major source of uncertainty in the application of MRF models, since typical solutions to this problem involve the minimization of a linear combination of singleton and higher order potentials, where the weights associated with this linear combination are chosen experimentally, and often need to be changed for each particular set of available observations.

In accordance with the invention, an alternative formulation of the MAP estimation problem is generated, based on the following observations:

1. Singleton potentials do not reflect properties of the field. Instead, they are used to allow violations of those properties in the estimation process, to bring the field into agreement with the observed data.

2. Higher order potentials do reflect properties of the field. In this case, the closer the field is to the assumed properties, the more predictable it becomes.

The alternative formulation, instead of finding a realization of the field which minimizes an arbitrarily-chosen linear combination of the singleton and higher order potentials, finds a realization in which the singleton potential is minimized, but subject to a constraint in the entropy of the field, computed using a measure that results only from considering higher order "cliques." This alternative formulation is referred to herein as entropy-constrained MAP estimation, and may be defined in the following manner.

Let $(f_s)_{s \in L}$ be a random field defined on a lattice L, with sample space $\Omega$ and typical realizations $\omega \in \Omega$. Let $U_S(\omega)$, $U_H(\omega)$ be a pair of valid Gibbs potentials, with the property that $U_S(\omega)$ is only defined in terms of singleton cliques, and $U_H(\omega)$ is only defined in terms of non-singleton, i.e., higher order, cliques. Let $\mu_H$ be a Gibbs measure on the field $(f_s)_{s \in L}$, defined by the potential $U_H(\omega)$. Then, the goal is to find a realization $\omega^*$ of the random field $(f_s)_{s \in L}$, such that $U_S(\omega)$ is minimized, subject to the constraint that the self-information of the solution with respect to the measure $\mu_H$ does not exceed a given bound. More formally, the problem may be stated as follows: find $\omega^*$ satisfying $$\omega^* = \arg\min_{\omega \in \Omega} U_s(\omega)/T$$

subject to $$-\log(\mu_H(\omega)) \leq R_{budget}.$$

The singleton potential is normalized by the temperature parameter T used in the definition of the measure $\lambda_H$. The parameter $R_{budget}$ represents the above-noted entropy constraint, and may be determined by an amount of encoding bandwidth, i.e., an encoding rate in terms of a number of bits per second, available for use in the corresponding encoding process.

As previously noted, the above-described entropy-constrained formulation may be transformed into an unconstrained optimization problem which is solvable using standard techniques. Let $\lambda$ be a positive real number, and define the Lagrangian cost function:

$$J(\omega,\lambda) = U_s(\omega)/T - \lambda \log(\mu_H(\omega))$$

It is well known that for any fixed value $\lambda_0$ there exists a value of the constraint $R_{budget}(\lambda_0)$, such that if $\omega(\lambda_0)$ is a solution to the unconstrained problem for $\lambda_0$, then $\omega$ is also a solution of the constrained problem, with constraint $R_{budget}(\lambda_0)$. See, e.g., Y. Shoham and A. Gersho, "Efficient Bit Allocation for an Arbitrary Set of Quantizers," IEEE Transactions on Acoustics, Speech and Signal Processing, 36(9), pp. 1445–1453, September 1988.

However, it should be noted that this is not equivalent to saying that for any rate constraint R, there exists a value of $\lambda_0$ of the Lagrange multiplier such that $R=R_{budget}(\lambda_0)$. The optimization problem being considered in this embodiment is one of discrete optimization, and Lagrangian methods such as the one used here can typically only achieve solutions lying on a convex hull of a region of achievable pairs (D, R), where the achievable pairs (D, R) are those for which there exists a realization $\omega$, from which D is obtained as $U_s(\omega)/T$ and R is obtained as $-\lambda \log(\mu_H(\omega))$. Therefore, if the convex hull is not densely populated, the solution thus obtained may be suboptimal. Although it is unclear whether the convex hull in the illustrative embodiment is densely or sparsely populated, the experimental results to be described below suggest that this issue may have little practical implication.

The solution of the resulting unconstrained problem may be obtained as follows. The unconstrained cost functional $J(\omega,\lambda)$ is composed of two additive terms: the original singleton potential $U_S(\omega)/T$, and the self information of the argument $-\log(\mu_H(\omega))$, scaled by the Lagrange multiplier $\lambda$. It can be shown that it is possible to write, for any fixed $\lambda$ and for all realizations $\omega \in \Omega$, $J(\omega,\lambda) = U^\lambda(\omega)$, where $U^\lambda(\omega)$ denotes a valid Gibbs potential. To see this, first observe that $-\lambda \log(\mu_H(\omega))$ reduces to a linear function of $U_H$:

$$-\lambda\log(\mu(\omega)) = -\lambda\log\left(\frac{1}{Z}\exp\left(-\frac{U_H(\omega)}{T}\right)\right)$$
$$= -\lambda\log\left(\frac{1}{Z}\right) - \frac{U_H(\omega)}{T}\log(e)$$
$$= c_\lambda + \lambda\frac{U_H(\omega)}{T}$$

where $c_\lambda = \lambda \log(Z)$ is a constant independent of the optimization argument $\omega$. So, $J(\omega, \lambda)$ can be written as:

$$J(\omega, \lambda) = \frac{U_s(\omega)}{T} - \lambda\log(\mu_H(\omega))$$
$$= \frac{U_s(\omega)}{T} + c_\lambda + \lambda\frac{U_H(\omega)}{T} \triangleq \frac{U^\lambda(\omega)}{T} + c_\lambda.$$

Therefore, since $U^\lambda(\omega) = U_S(\omega) + \lambda U_H(\omega)$ defined in this way is a valid potential, and since $$\arg\min_\omega J(\omega, \lambda) = \arg\min_\omega U^\lambda(\omega),$$

the unconstrained problem is exactly the same as that of classical MAP estimation with MRF posteriors. Therefore, all of the standard techniques available to solve the classical problem are also applicable to the solution of the constrained problem.

Note that in classical formulations of MAP estimation problems related to Gibbs distributions, e.g., image restoration, image segmentation, unconstrained estimation of motion for machine vision problems, etc., there is generally no clear criteria for deciding how to assign relative weights to the strengths of the internal and external forces. As a result, ad-hoc choices are made in those contexts, i.e., the relative weights between $U_S(\omega)$ and $U_H(\omega)$ are usually adjusted on a per-sequence basis. The techniques of the present invention avoid the need for this undesirable ad-hoc adjustment.

The above-noted multiscale MRF data model for motion fields will now be described in greater detail. The key features expressed by this data model are:

1. Spatial Coherence. Motion fields are mostly smooth, i.e., motion vectors corresponding to pixels at nearby spatial locations are likely to be similar, since such pixels most of the time correspond to a single moving object. Therefore, the model assigns probabilities to fields in such a way that smooth fields are more likely than rough fields.

2. Temporal Coherence. An argument similar to that made above in the case of spatial coherence holds here, where temporal neighbors refer to pixels at spatially close locations in adjacent frames.

3. Scale Coherence. Image sequences are observed at a single scale. This means that in order to obtain multiscale, successively-refined motion estimates, it is necessary to define in what sense the coarse fields approximate the finest field. The model does this by letting a motion vector at a coarse scale represent the average motion over some set of pixels in the observed sequence, where the size of this set of pixels increases as the field becomes coarser.

It should be noted that other multiscale data models in accordance with the invention may characterize only a subset of the above-noted spatial coherence, temporal coherence and scale coherence properties of the dense motion fields. For example, the temporal coherence aspects of the model could be eliminated if factors such as delay and buffer size become problematic in a given application.

As described previously, higher order potential functions are used to express structural properties of a field, while singleton potential functions are used to express how observations update the likelihood with which fields occur. In the MRF data model, the coherence properties listed above are expressed as follows.

1. The set of neighbor sites for a given center site 10 in a motion frame n are as shown in FIG. 1. The FIG. 1 diagram shows motion frames n−1, n, and n+1, for motion pyramid coarseness levels k and k+1. Each of the motion pyramid levels corresponds to a different scale, e.g., motion pyramid level k+1 corresponds to a coarser scale than motion pyramid level k. The site 10 corresponds to a particular pixel in motion frame n at level k. The site 10 has 19 neighbor sites in this example: (i) eight neighbors surrounding it in frame n at level k (based on spatial coherence); (ii) five neighbors in frame n−1 at level k, and five neighbors in frame n+1 at level k (based on temporal coherence); and (iii) one neighbor in frame n at level k+1 (based on scale coherence). The neighbor sites are also referred to herein as neighbor pixels or simply as neighbors.

2. All cliques are given by pairs of sites, where one of the elements in each pair is the center site 10, and the other element of each pair is one of the neighbor sites.

3. Clique potentials are defined to be inversely proportional to a measure of similarity between the vectors associated with each clique, i.e., the more similar the vectors, the lower the potential.

4. Singleton potentials are defined as the average energy in the motion prediction error signal, where averages are taken over suitable blocks of size $2^k \times 2^k$, for each site at motion pyramid level k.

Additional details regarding the above-described neighborhood systems, cliques, and potential functions may be found in S. Servetto and C. Podilchuk, "Stochastic Modeling and Entropy Constrained Estimation of Motion from Image Sequences," Proceedings of the International Conference on Image Processing, Chicago, Ill., Oct. 4–7, 1998, which is incorporated by reference herein.

An exemplary dense motion field estimation process in accordance with the invention will now be described in greater detail, with reference to FIG. 1. The motion estimation process in this example is attempting to estimate a multiresolution motion field $$W^* = W_j^k = \left( w_1^k, w_2^k, \ldots w_{\frac{N}{(2^k \times 2^k)}}^k \right)$$

at each frame n. At the finest level of the above-noted motion pyramid, $W^0$, there are N motion vectors, corresponding to one motion vector per pixel. At the next level of the motion pyramid, $W^1$, there are $N/(2 \times 2)$ or $N/4$ motion vectors corresponding to one motion vector for every 2×2 pixel block in the original video frame.

In order to find the optimum motion field, the motion vector at every site s is updated across all levels of the pyramid k and for each frame n. These updates are local operations which minimize the local singleton potential $U_{SL}(S)$ and weighted local higher order potential $U_{HL}(S)$, where L denotes local. One iteration results in one update for every site s. The process may perform several iterations and stop when the total energy decrease between iterations is sufficiently small, indicating that the solution is converging to a local minimum. The total energy at iteration i is given by:

$$E^{(i)} = U_S^{(i)} + \lambda U_H^{(i)}$$

where $U_S^{(i)}$ is the singleton potential for the entire motion field at iteration i, and $U_H^{(i)}$ is the higher order potential for the entire motion field at iteration i. More specifically, $$U_S^{(i)} = \sum_s U_{SL}^{(i)}(s) \text{ and}$$

$$U_H^{(i)} = \sum_s U_{HL}^{(i)}(s).$$

The operator λ is a scalar number, such that as λ increases, the motion field is smoother and easier to encode, i.e., requires fewer bits.

The local potential is derived for each site s by finding the minimum potential over all motion vectors w defined within a search window:

$$E_L^{(i)}(s) = \min_{w, |w| \leq \text{search window}} U_{SL}^{(i)}(s) + \lambda U_{HL}^{(i)}(s),$$

where $$U_{SL}^{(i)}(s) = |I^{n-1}(s) - I^n(s+w(s))|.$$

The local singleton potential is determined by the absolute difference of the pixel value in frame n−1 at site s, i.e., $I^{n-1}(s)$, with the pixel value of frame n at displaced location (s+w(s)), i.e., $I^n(s+w(s))$. The local higher order potential, referring to FIG. 1, is given by:

$$E_{HL}^{(i)}(s) = \sum_{\substack{(s, s_i) \\ \text{valid cliques}}} |w(s) - w^{(i-1)}(s_i)|$$

$$= |w(s) - w^{(i-1)}(\text{above})| +$$

$$|w(s) - w^{(i-1)}(\text{below})| +$$

-continued $|w(s) - w^{(i-1)}(\text{right})| +$ $|w(s) - w^{(i-1)}(\text{left})| +$ $|w(s) - w^{(i-1)}(\text{above, left})| +$ $\ldots + |w(s) - w(s, \text{level}(k+1)|,$ where the terms "above", "below", "right" and "left" are with reference to the site 10 of FIG. 1, e.g., w(above, left) denotes the w value corresponding to the neighbor above and to the left of site 10 in FIG. 1.

Figure 2:
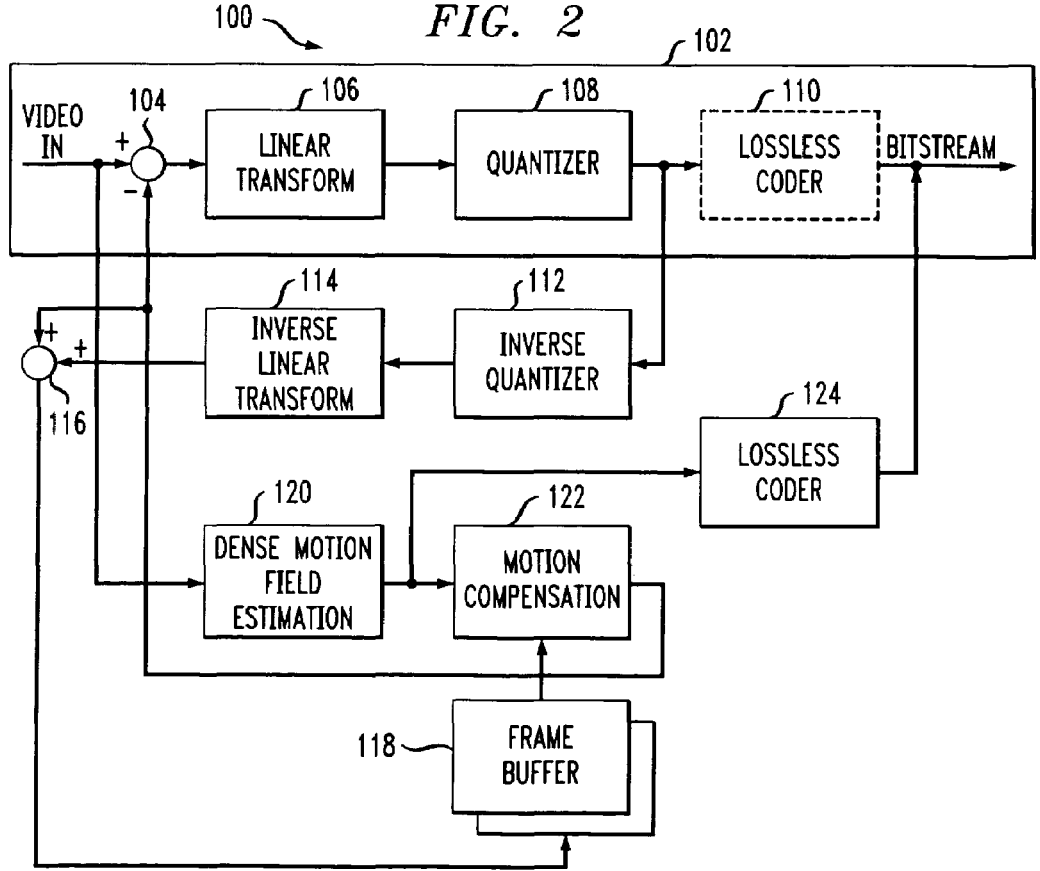
FIG. 2 shows an illustrative embodiment of a video encoder which utilizes dense motion field estimation and compensation in accordance with the invention.

FIG. 2 shows an illustrative embodiment of a video encoder 100 which uses the above-described techniques to implement dense motion field estimation and compensation, in accordance with the invention. The portion 102 of the video encoder 100 represents the minimal set of processing elements required when the encoder is operating in an intra-frame coding mode, i.e., a mode without inter-frame motion estimation and compensation. An input video signal is applied via signal combiner 104 to a linear transform element 106 which may be, e.g., a discrete cosine transform (DCT), a wavelet decomposition, a fast Fourier transform, etc.

The input video signal may be any sequence of progressive or interlaced frames suitable for encoding in accordance with a video compression technique. A progressive frame sequence generally has a frame rate of 30 frames per second with a single field in each frame, while an interlaced frame sequence generally includes two fields in each frame and therefore will include 60 fields per second at a 30 frame per second frame rate. The two fields in each frame of the interlaced sequence include an even field corresponding to even scan lines and an odd field corresponding to odd scan lines. The input video signal may be supplied from a video source such as a video camera, a telecine source, a video receiver, a digital video disc (DVD) drive, a video cassette recorder, other types of magnetic or optical drives, and the like.

The output of the linear transform element 106 is quantized in a quantizer 108, which may be, e.g., a scalar quantizer, a vector quantizer, a zero-tree quantizer, etc. An optional lossless coder 110 processes the output of the quantizer 108 to generate an encoded digital bitstream. The lossless coder 110 may be, e.g., a Huffman coder, an arithmetic coder, a context-dependent arithmetic coder, etc.

When the encoder 100 is operating in an inter-frame coding mode, i.e., a mode with inter-frame motion estimation and compensation, the output of the quantizer 108 for a current frame of the video signal, i.e., a frame n, is applied to an inverse quantizer 112 and an inverse linear transform 114, in order to recover a representation of frame n. This representation is combined in a signal combiner 116 with an output of a motion compensator 122 generated for a previous frame, i.e., a frame n−1, and the resulting representation is stored in a storage element of a frame buffer 118. The output of the motion compensator 122 for frame n−1 is also subtracted from the current frame n in signal combiner 104.

A dense motion field estimation element 120 receives as inputs frame n of the input video signal, and a representation generated for the frame n−1 and stored in the frame buffer 118. Using these inputs, the dense motion field estimation element performs dense motion field estimation in accordance with the techniques described above. The resulting motion estimates, e.g., motion vectors, are applied to motion compensator 122, which generates a motion compensation signal that is applied to signal combiners 104 and 116 as previously described. The motion estimates generated by element 120 are also encoded in a lossless coder 124 and combined with the output bitstream for transmission to a decoder.

A typical coding sequence in the encoder 100 may include an intra-coded (I) frame followed by several forward-only predictive (P) frames. For example, the above-noted frame n−1 of the input video signal may be intra-coded using the elements of portion 102 of the encoder. Since there is no motion compensation at this point, the motion compensator 122 does not generate an output, and a decoded representation of frame n−1 generated by elements 112 and 114 may be stored in the frame buffer for use in motion estimation and compensation of the next frame, frame n. The dense motion field estimation element 120 then uses frame n and the stored representation of frame n−1 to generate the above-noted motion estimates.

It should be noted that the elements of the video encoder 100 may be implemented using a central processing unit (CPU), microprocessor, application-specific integrated circuit (ASIC) or other data processing device in a computer, video transmitter, cable system headend, television set-top box or other type of video signal processor. The video encoder 100 may be utilized in conjunction with or as an element of numerous different types of video processing or transmission systems, including global computer networks such as the Internet, wide area networks, local area networks, cable systems, satellite systems and standard wired telephone networks. For example, the encoding techniques of the invention are suitable for use in systems such as switched digital video (SDV), hybrid fiber/coax (HFC), direct broadcast satellite (DBS), multichannel multipoint distribution service (MMDS) and digital subscriber loop (DSL) systems.

A corresponding decoder suitable for use in decoding a coded bitstream generated by the encoder 100 may be implemented as a straightforward inversion of encoder 100, less the motion estimation elements. Such an arrangement will be readily apparent to those of ordinary skill in the art, and is therefore not described in detail herein. Because an encoder in accordance with the invention is generally considerably more complex than its corresponding decoder, such an encoder is typically better suited for use in "one-way" applications such as video streaming over the Internet, broadcast television systems, cable or satellite television systems, etc., than in "two-way" applications such as video conferencing.

Figure 3:
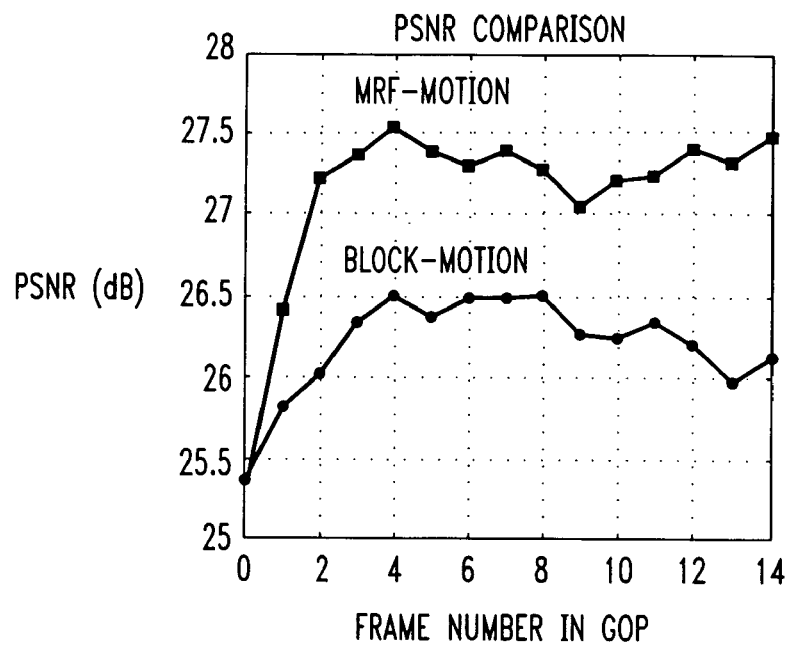
FIGS. 3 and 4 are plots comparing the performance of an exemplary dense motion field based encoding technique in accordance with the invention with a conventional block-based encoding technique.
Figure 4:
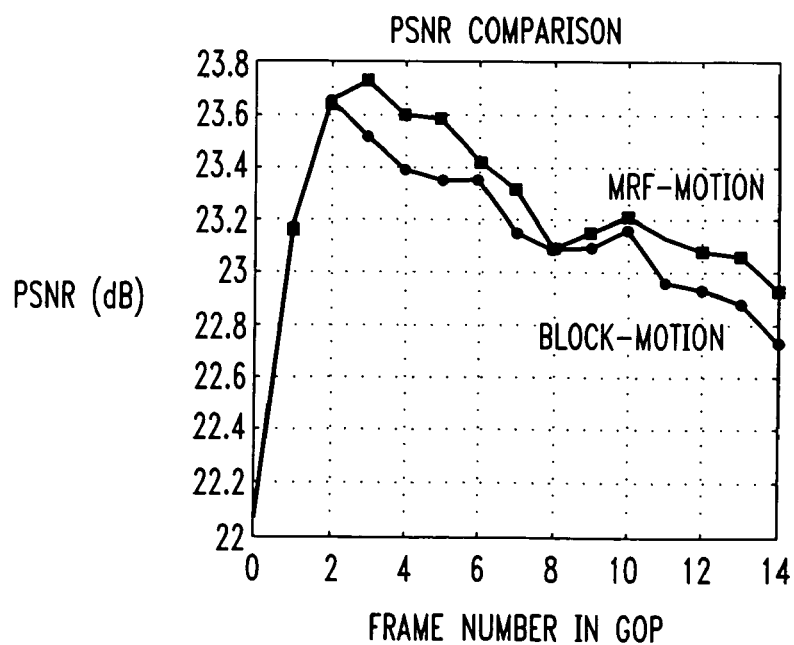

FIGS. 3 and 4 illustrate performance improvements attributable to the dense motion field estimation and compensation of the invention, in terms of peak signal-to-noise ratio (PSNR) as a function of frame number. These plots compare the performance of a dense field MRF-based coding technique in accordance with the invention with a conventional block-based coding technique, for two different types of frame sequences. The PSNR for images assumes a peak pixel intensity value of 255.

It is also assumed for the performance measurements shown in FIGS. 3 and 4 that the video encoder implementing the dense field technique partitions video frames into groups of pictures (GOPs), where each GOP includes $N_F$ frames which are coded independently. Within each GOP, the first frame is encoded as a still image, i.e., is an I frame, and the remaining $N_F-1$ frames are P frames encoded using the dense motion field estimation of the invention. Residues are also coded as still images. The still image portion of the coder, i.e., I frame and residue portion of the coder, is assumed to be a standard wavelet-based coder, such as that described in S. Servetto, K. Ramchandran, and M. Orchard, "Image Coding Based on a Morphological Representation of Wavelet Data," IEEE Transactions on Image Processing, December 1996.

The motion vectors within a given GOP are encoded in two steps. First, each vector in the above-described multiscale pyramid is replaced by the difference of itself with its parent vector. The intuition for this approach is that due to the scale coherence property of the field, parent and children vectors will generally be similar. Second, each scale in the pyramid is encoded using an adaptive arithmetic coder.

The rate control mechanism adopted is essentially constant bitrate. Denoting by M the total number of bits required to encode all motion vectors, T the total budget, and I the bits used to encode the I frame, $(T-M-I)/(N_F-1)$ is the number of bits spent on coding each of the remaining $N_F-1$ P frames in the group.

For the block-based encoder, the basic architecture, the rate control mechanism, and the I frame and residue coder are assumed to be the same as for the dense field encoder. The only difference is that motion in the block-based coder is estimated using block matching, and coded using a standard entropy coder.

The performance comparison in FIG. 3 is for a head-and-shoulders, low-motion type of standard test sequence known as "Manya," while the performance comparison in FIG. 4 is for a sports-related, high-motion type of standard test sequence known as "football." Both sequences are of size 352×240 pixels×30 frames/sec. In each case, the above-described dense field and block-based encoders encoded GOPs of $N_F=15$ frames at a time. For the plots of FIGS. 3 and 4, the Manya sequence was coded at a total rate of 0.05 bits/pixel (124 Kbits/sec), while the football sequence was coded at 0.125 bits/pixel (310 Kbits/sec).

FIGS. 3 and 4 present the results for one typical GOP for each of the above-described test sequences. For the Manya sequence, the motion bitrate was 16.7 Kbits/sec (dense field, $\lambda=2$) and 52.9 Kbits/sec (block-based). For the football sequence, the motion bitrate was 53.1 Kbits/sec (dense field, $\lambda=4$) and 73.7 Kbits/sec (block-based). For both of the dense fields, the last two refinement levels in the motion pyramid were discarded. Each I frame received 0.1 bits/pixel (8448 bits). Any bits left after coding the motion estimates and the I frame in each GOP were split evenly among all remaining P frames.

FIG. 3 indicates that for the Manya sequence the dense field coding of the invention attained an average improvement of about 0.93 dB in PSNR over the equivalent block-based coder. FIG. 4 indicates that for the football sequence, the average PSNR for the dense field coding and the block-based coding are substantially the same. In terms of subjective quality of the reconstructed video signal, the improvement achieved by the dense field coding of the invention is significant in both cases, since it is free from certain blocking artifacts characteristic of block-based coding. Repeating the measurements at rates from 128 Kbits/sec to 2.5 Mbits/sec indicates that better results are generally obtained at lower rates.

The above-described embodiments of the invention are intended to be illustrative only. For example, although illustrated using a particular type of encoder architecture, the dense field coding techniques of the invention can be applied to many other types of encoders and encoding systems. These and numerous other embodiments within the scope of the following claims will be apparent to those skilled in the art.

What is claimed is:

1. A method for encoding an image sequence, the method comprising the steps of:
  generating an estimate of apparent motion within the image sequence utilizing a dense motion field of a portion of the image sequence, wherein the estimate comprises a plurality of motion vectors each corresponding to an element of the dense motion field, and is generated at least in part as a constrained function of a characterization of motion between elements of the dense motion field and elements of one or more other portions of the image sequence; and
  utilizing the estimate to perform motion compensation on at least one of the images of the image sequence;
  wherein the constrained function comprises a first maximum a posteriori (MAP) estimation problem with a constraint on the entropy of the desired estimate; and
  wherein the generating step further includes the step of transforming the constrained function into a second MAP estimation problem having at least one parameter uniquely determined by the entropy constraint wherein the entropy constraint is determined by an amount of bandwidth available for encoding the image sequence.

2. The method of claim 1 wherein the image sequence comprises a sequence of video frames.

3. The method of claim 1 further including the step of encoding the estimate such that the estimate may be transmitted to decoder for use in decoding encoded versions of one or more of the images of the sequence.

4. The method of claim 1 wherein the characterization is based on a multiscale data model which characterizes the motion as a Markov random field (MRF).

5. The method of claim 4 wherein the multiscale data model characterizes at least one of spatial coherence, temporal coherence and scale coherence of the dense motion field.

6. The method of claim 4 wherein the multiscale data model allows a motion vector at a coarse scale to represent an average motion over a set of pixels from a given image of the sequence to another image of the sequence.

7. The method of claim 4 wherein the multiscale model utilizes higher order potential functions to characterize structural properties of the dense motion field, and singleton potential functions to characterize the manner in which observations of particular types of dense motion fields affect the likelihood with which such fields occur.

8. The method of claim 1 wherein a solution of the second MAP estimation problem minimizes a singleton potential function subject to the entropy constraint, wherein the entropy constraint is computed based on one or more higher order potential functions.

9. An apparatus for encoding an image sequence, the apparatus comprising:
  a motion estimator operative to generate an estimate of apparent motion within the image sequence utilizing a dense motion field of a portion of the image sequence, wherein the estimate comprises a plurality of motion vectors each corresponding to an element of the dense motion field, and is generated at least in part as a constrained function of a characterization of motion between elements of the dense motion field and elements of one or more other portions of the image sequence; and a motion compensator having an input coupled to an output of the motion estimator, and operative to utilize the estimate to perform motion compensation on at least one of the images of the image sequence;

wherein the constrained function comprises a first maximum a posteriori (MAP) estimation problem with a constraint on the entropy of the desired estimate; and wherein the motion estimator is further operative to transform the constrained function into a second MAP estimation problem having at least one parameter uniquely determined by the entropy constraint, wherein the entropy constraint is a function of an amount of bandwidth available for encoding the image sequence.

10. The apparatus of claim 9 wherein the image sequence comprises a sequence of video frames.

11. The apparatus of claim 9 further including a lossless coder for encoding the estimate such that the estimate may be transmitted to decoder for use in decoding encoded versions of one or more of the images of the sequence.

12. The apparatus of claim 9 wherein the characterization is based on a multiscale data model which characterizes the motion as a Markov random field (MRF).

13. The apparatus of claim 12 wherein the multiscale data model characterizes at least one of spatial coherence, temporal coherence and scale coherence of the dense motion field.

14. The apparatus of claim 12 wherein the multiscale data model allows a motion vector at a coarse scale to represent an average motion over a set of pixels from the given image to another image of the sequence.

15. The apparatus of claim 12 wherein the multiscale model utilizes higher order potential functions to characterize structural properties of the dense motion field, and singleton potential functions to characterize the manner in which observations of particular types of dense motion fields affect the likelihood with which such fields occur.

16. The apparatus of claim 9 wherein a solution of the second MAP estimation problem minimizes a singleton potential function subject to the entropy constraint, wherein the entropy constraint is computed based on one or more higher order potential functions.

17. A method for encoding an image sequence, the method comprising the steps of:

generating an estimate of apparent motion within the sequence, wherein the estimate is generated at least in part utilizing a Markov random field (MRF) model to characterize motion between a given pixel of a motion field and one or more neighbor pixels subject to a constrained function; and utilizing the estimate to perform motion compensation on at least one of the images of the sequence;

wherein the constrained function comprises a first maximum a posteriori (MAP) estimation problem with a constraint on the entropy of the desired estimate; and wherein the generating step further includes the step of transforming the constrained function into a second MAP estimation problem having at least one parameter uniquely determined by the entropy constraint, wherein the entropy constraint is determined by an amount of bandwidth available for encoding the image sequence.

18. The method of claim 17 wherein the estimate comprises a plurality of motion vectors, with each of the motion vectors corresponding to a pixel of the motion field.

19. The method of claim 17 wherein the neighbor pixels comprise at least one pixel in the same image as the given pixel, at least one pixel in a previous image of the sequence, and at least one pixel of a subsequent image of the sequence.

20. An apparatus for encoding an image sequence, the apparatus comprising:

a motion estimator operative to generate an estimate of apparent motion within the sequence, wherein the estimate is generated at least in part utilizing a Markov random field (MRF) model to characterize motion between a given pixel of a motion field and one or more neighbor pixels subject to a constrained function; and a motion compensator having an input coupled to an output of the motion estimator, and operative to utilize the estimate to perform motion compensation on at least one of the images of the sequence;

wherein the constrained function comprises a first maximum a posteriori (MAP) estimation problem with a constraint on the entropy of the desired estimate; and wherein the motion estimator is further operative to transform the constrained function into a second MAP estimation problem having at least one parameter uniquely determined by the entropy constraint wherein the entropy constraint is a function of an amount of bandwidth available for encoding the image sequence.

21. The apparatus of claim 20 wherein the estimate comprises a plurality of motion vectors, with each of the motion vectors corresponding to a pixel of the motion field.

22. The apparatus of claim 20 wherein the neighbor pixels comprise at least one pixel in the same image as the given pixel, at least one pixel in a previous image of the sequence, and at least one pixel of a subsequent image of the sequence.

* * * * *